United States Patent Office 3,819,607
Patented June 25, 1974

3,819,607
METHOD FOR PRODUCING PEPTIDES BY REACTION OF AMINO ACID N-CARBOXYANHYDRIDES WITH SCHIFF'S BASES
Leon John Heuser, Robbinsville, and Carl Francis Anderson, Milltown, N.J., assignors to E. R. Squibb & Sons, Inc., Princeton, N.J.
No Drawing. Continuation-in-part of abandoned application Ser. No. 31,755, Apr. 24, 1970. This application July 31, 1972, Ser. No. 276,505
Int. Cl. C07c 103/52; C07g 7/00
U.S. Cl. 260—112.5                                   5 Claims

ABSTRACT OF THE DISCLOSURE

Peptides are produced by an improved method which minimizes side reactions and facilitates the separation of the product in high yield. This method comprises reacting the imine reaction product of one amino acid and an aromatic aldehyde with about an equimolar proportion of the N-carboxy anhydride of a second amino acid at a temperature within the range of about 0° to 60° C. in an organic solvent within which both reactants are soluble and hydrolyzing the reaction product with aqueous acid.

---

This application is a continuation-in-part of application Ser. No. 31,755, filed Apr. 24, 1970, and now abandoned.

BACKGROUND AND SUMMARY OF THE INVENTION

Peptides include a large body of substances which are important because of their biological properties. See Law, Organic Chemistry of Peptides (Wiley—Interscience, London) 1970. These substances are largely made up of various amino acids or derivatives thereof. The amino acids and the peptides occur in many naturally occurring and synthetic biologically active substances of which proteins, γ-globulin, insulin and various antibiotics are but a few examples. By way of illustration phenylglycine, threonine, proline, alanine and others are found in antibiotics such as vernamycin and ostreogricin. Valine, arginine, phenylalanine, etc. are found in secretin. Phenylglycine, proline and histidine occur in angiotensin. See page 127 of the Law text supra for a few of the many additional illustrations. Peptides are thus useful in themselves or as intermediates used in the buildup of larger peptide molecules having biological activity as described in the cited text and many other works on the subject.

Various processes for the production of peptides by the coupling of amino acids are known. These include many ways of protecting the amino group of one of the reactants while the acid group reacts with the amino group of the other reactant in various solvent systems. The use of certain protective groups requires a special step of removing this group after the coupling has been effected. Others give rise to side reactions which reduce the yield and contaminate the products.

It has now been found that an improved process for the production of peptides results when a Schiff's base is formed from the amino acid or terminal amino acid of a chain, which constitutes one reactant, by reaction with an aldehyde. This Schiff's base is reacted in an organic solvent with an N-carboxy anhydride of the amino acid or terminal amino acid of a chain which constitutes the second reactant. This method is particularly preferred for the formation of dipeptides.

DETAILED DESCRIPTION OF THE INVENTION

According to this invention, one of the pair of amino acid reactants to form the peptide is caused to react with a reactive aromatic aldehyde, not including an α-hydroxy group, to form a Schiff's base imine reaction product. It is preferable for best results for the amino acid to be in the form of its ester, e.g., a lower alkyl ester like the methyl or ethyl ester or an aralkyl ester, for example a phenyl-lower alkyl ester like the benzyl ester. Amides may also be used, but in general the esters give better results.

The second amino acid is converted to its N-carboxy anhydride, by one of the procedures referred to below, a preferred method involving the treatment of the amino acid with phosgene, in an inert organic solvent like toluene, dioxane or tetrahydrofuran and isolating the product, if desired, by concentration or precipitation with a hydrocarbon like hexane or the like.

Then according to this invention, the amino acid-imine reaction product is reacted with the N-carboxy anhydride of the second amino acid in an organic solvent system preferably comprising a chlorinated alkane having not more than three chlorine atoms on a single carbon. The aldehyde reaction product is also soluble in the organic solvent and if desired may be recovered, for example, by removal of the solvent by concentration. Hydrolysis of this reaction product gives the free peptide.

The new process of this invention may be illustrated as follows:

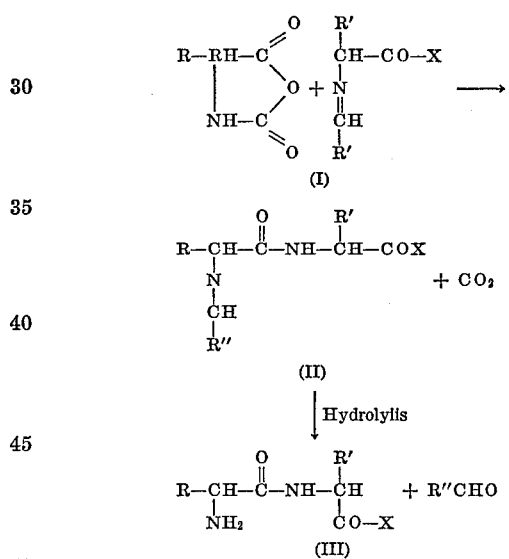

In the foregoing reaction scheme, R and R' are the residues of the amino acids, R"CHO is the aldehyde used for the Schiff base preparation and X is the residue of the ester or amide all as described below in more detail.

Any α-amino acid may be treated according to this invention. This includes the naturally occurring α-amino acids [see, for example, Hackh's Chemical Dictionary, 3rd ed. (1944), pages 44–45], such as the mono-amino-monocarboxylic aliphatic and aromatic acids, e.g., glycine, alanine, valine, leucine, isoleucine, phenylalanine, tyrosine, serine, threonine, etc., the monoaminodicarboxylic acids, and their amides, e.g., aspartic acid, glutamic acid, glutamine, asparagine, etc., the diaminomonocarboxylic acids, e.g., arginine, lysine, etc., heterocyclic amino acids, e.g., histidine, tryptophane, etc., sulfur containing amino acids, e.g., cysteine, cystine, methionine, etc., as well as α-amino acids of the type which do not occur in proteins, e.g., phenylglycine, ornithine, butyrine, citrulline, homocystine, etc.

These amino acids may generally be of the formula

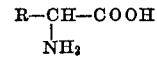

wherein R is the residue of the amino acid, e.g., those named above, namely, hydrogen, lower alkyl (either branched or straight chain), hydroxy-lower alkyl, aryl, e.g., phenyl or phenyl bearing one or more of the substituents, hydroxy, methoxy, benzyloxy, etc., mercapto, mercapto-lower alkyl, lower alkylmercapto-lower alkyl, carboxy, carboxy-lower alkyl, amino-lower alkyl, amido-lower alkyl, ureido-lower alkyl, guanidino-lower alkyl, imidazolyl, indolyl, imidazolyl-lower alkyl, indolyl-lower alkyl and the like.

The term N-carboxy anhydride, as used herein, refers to N-carboxy-α-amino acid anhydrides as described in Advances in Protein Chemistry, Vol. XIII (Academic Press, New York, 1958), pages 248 to 271.

Any amino acid of the character described above which forms an N-carboxy anhydride may be used as the one reaction component. These N-carboxyanhydrides may be prepared by the methods of Curtius, Leuchs or Fuchs-Farthing as described in Advances in Protein Chemistry, supra. Preferred is the method in which the amino acid is treated with phosgene in an inert organic solvent such as toluene, dioxane or the like.

Similarly, to form the second component of the reaction, an amino acid of the character described above is reacted with an aldehyde to produce a Schiff's base imine reaction product of the type described in U.S. Pat. 3,288,800, Nov. 29, 1966, e.g., aldehydes of the formula (V)         R''—CHO wherein R'' is lower alkyl, lower alkenyl, phenyl, substituted phenyl, naphthyl or substituted naphthyl.

The lower alkyl groups represented by the symbols are straight or branched chain hydrocarbon groups of up to seven carbon atoms such as methyl, ethyl, propyl, butyl, isobutyl and the like. The lower alkoxy groups contain lower alkyl groups of the same type. The lower alkenyl groups are similar monounsaturated groups, unsubstituted and substituted phenyl groups include phenyl, nitrophenyl, halophenyl, e.g., o-, m- and p-nitrophenyl, 2,3-dinitrophenyl, o-, m- and p-chlorophenyl, o-, m- and p-bromophenyl, o-, m- and p-iodophenyl, 2,3-dichlorophenyl, 3,4-dibromophenyl, 2,3,4-trichlorophenyl, 2,4,5-trichlorophenyl, etc.

Preferred are benzaldehydes or naphthaldehydes of the formulas

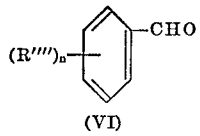   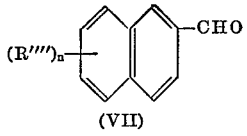

(VI)                (VII)

wherein R'''' is hydrogen, cyano, halo, especially chloro, lower alkanesulfonyl or nitro, and $n$ is an integer from 1 to 3, especially 1.

The amino acid is reacted with the aldehyde in an inert solvent, preferably in water under conventional conditions for forming a Schiff's base. The time period may vary within rather broad limits depending upon the particular reactants, but a period of about 1 hour to about 24 hours is generally adequate. Stirring and/or heating will of course accelerate the reaction. Temperatures in the range of about 0° to 60° C. may be used.

The reaction between the N-carboxyanhydride of the one amino acid and the Schiff's base of the second amino acid is carried out in an inert organic solvent in which both reactants are soluble such as chlorinated solvents, e.g., chlorinated hydrocarbons or alkyl ketones. Preferred as solvents are chlorinated alkanes of not more than four carbon atoms and no more than three chlorines on a single carbon. These include, for example, methylene chloride, which is the first choice, chloroform, trichloroethylene, ethylene dichloride and the like. Ketones like methyl isobutyl ketone, acetone, etc., may also be used.

The temperature of reaction is within the range of about 0 to 20° C., when dipeptides are prepared. Somewhat higher temperatures, e.g., up to about 60° C. may be necessary to form higher peptides.

The reactants are preferably used in approximately equimolar proportions. The reaction is generally complete after about 1 to 3 hours.

Upon completion of the reaction, the product is removed from the reaction mixture by concentration and precipitation. When a chlorinated alkane is used as the reaction solvent, the latter may generally be removed by evaporating under vacuum.

Hydrolysis of the product, e.g., by adding aqueous acid, e.g., a mineral acid like hydrochloric acid, to a solution of the Schiff's base in an organic solvent eliminates the aldehyde which formed the Schiff's base and the product will generally crystallize out.

If the Schiff's base is formed from an ester or amide of the amino acid, i.e., X is methoxy, ethoxy, butoxy, benzyloxy, amido, methylamido, etc., then the same groups will be present in the final product. The polypeptides may then be treated, if desired, to remove these groups, to obtain the free carboxy groups, e.g., by more vigorous hydrolysis or hydrogenolysis depending on the ester or amide group present.

Additional reactive functional groups like hydroxy, mercapto, amino, guanidino, carboxy, etc. occur in certain of the amino acids such as serine, threonine, lysine, histidine, cysteine and the like. In such cases these reactive groups are protected in the conventional manner through the use of the appropriate protective group such as carbobenzoxy, t-butoxycarbonyl, benzyl ether, dihydropyranyl, t-butyl ester, benzyl ester and the like.

The reaction of the N-carboxy anhydride of one amino acid with the Schiff's base of the second amino acid results in superior yields of product and facilitates the recovery of the product. Since amines are good polymerization initiators, the peptides formed by the reaction of an N-carboxy anhydride with an amino acid itself may be contaminated with poly-α-amino acids even when a large excess of the α-amino acid is used. Using the Schiffs base of the second amino acid minimizes polymerization so that excellent yields may be obtained. NMR and IR studies indicate little or no side reactions. The use of an organic solvent as the reaction medium instead of an aqueous system avoids complications due to the instability of N-carboxy anhydrides in aqueous solution.

The following examples are illustrative of the invention. Temperatures are expressed on the centigrade scale.

Example 1

125 g. of D(—)-α-phenylglycine are slurried in 1.25 liter of tetrahydrofuran and warmed to 40°. Phosgene is slowly introduced at a rate to maintain a temperature of 45–50°. The addition is continued until the solution clears (2 hrs. 10 min.) and nitrogen is passed through to remove excess phosgene.

The solution is then concentrated under vacuum to 265 ml. and 800 ml. of hexane are added slowly with rapid agitation over a period of 20 minutes. The slurry is kept in the cold for 1 hour and then the crystals are filtered and washed with an additional 200 ml. of hexane. The N-carboxy-D-phenylglycine anhydride is dried overnight under vacuum over $P_2O_5$. Yield 125.1 g. (85%).

Example 2

8.6 g. of phenylalanine methyl ester hydrochloride are slurried in 100 ml. of water at room temperature and the pH adjusted to 7.5 with 20% aqueous sodium hydroxide. 5.2 ml. of benzaldehyde are added and the pH drops rapidly to 5.2. The pH is readjusted to 6.3–6.5 with additional sodium hydroxide and the mixture is stirred at room temperature for three hours during crystallization. After storing for 1 hour at 5°, the crystals are filtered, washed with water and hexane and dried under vacuum. Yield 8.8 g. of N-benzylidene Schiff's base of phenylalanine methyl ester.

Recrystallization from hexane gives material (M.P. 52–53°) with the following analysis:

Calculated for $C_{17}H_{17}NO_2$: C, 76.4; H, 6.4; N, 5.2. Found: C, 76.54; H, 6.40; N, 5.22.

Example 3

2.5 g. of the N-benzylidene phenylalanine Schiff's base as prepared in Example 2 is dissolved in 62.5 ml. methylene chloride and the solution is cooled to 0°. Over a period of 20 minutes, 1.8 g. of N-carboxy-D-phenylglycine anhydride is added with agitation and the reaction is continued for 3 hours at 0–1°. After standing at 5° overnight the solution is clarified. After addition of 30 ml. of water, the methylene chloride is removed under vacuum. Crystalline material is obtained by addition of hexane and slurrying at room temperature. The crystals are filtered, washed with water and dried. Yield: 3.0 g. of material, M.P. 80–82°.

*Analysis.*—Calculated for $C_{25}H_{24}N_2O_3$: C, 75.0; H, 6.0; N, 7.0. Found: C, 74.03; H, 5.97; N, 7.29.

The Schiff's base is hydrolyzed by dissolving in isopropyl ether, adding water and acidifying with hydrochloric acid while a permanent turbidity is obtained. The crystalline material that forms is recrystallized from isopropanol to give phenylglycyl phenylalanine methyl ester hydrochloride, M.P. 218–219°.

*Analysis.*—Calculated for $C_{18}H_{21}N_2O_3Cl$: C, 62.0; H, 6.11; N, 8.0; Cl, 10.2. Found: C, 61.75; H, 6.11; N, 7.87; Cl, 10.11.

Example 4

3 g. of N-carboxy-D-phenylglycine anhydride are dissolved in 50 ml. of chloroform and 8 g. of N-benzylidene Schiff's base of phenylalanine methyl ester are added at room temperature with agitation. The reaction is continued at this temperature for three hours. Concentration of the chloroform solution into 25 ml. water yields 9.5 g. of benzylidene phenylglycyl phenylalanine methyl ester.

Example 5

The Schiff's base of D,I-valinamide is prepared by neutralizing a slurry of the amide hydrochloride in water with 40% sodium hydroxide and adding one equivalent of benzaldehyde. To a solution of 4 g. of the Schiff's base in 75 ml. of methylene chloride are added 3.5 g. N-carboxy-D-phenylglycine anhydride. The reaction is carried out for 20 hours at room temperature. The crude N-benzylidene phenyl glycyl valinamide (7 g.) is isolated by concentration into water. The product is purified by extraction with isopropyl ether and concentration.

What is claimed is:

1. A process for the production of peptides which comprises reacting the imine reaction product of one amino acid

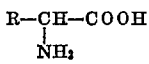

or lower alkyl or phenyl-lower alkyl ester thereof, wherein R is hydrogen, lower alkyl, hydroxy-lower alkyl, phenyl, substituted phenyl wherein the phenyl bears hydroxy, methoxy or benzyloxy, mercapto, mercapto-lower alkyl, lower alkylmercapto-lower alkyl, carboxy, carboxy-lower alkyl, amino-lower alkyl, amido-lower alkyl, ureido-lower alkyl, guanidino-lower alkyl, imidazolyl, indolyl, imidazolyl-lower alkyl or indolyl-lower alkyl, with an aldehyde R″—CHO, wherein R″ is lower alkyl, lower alkenyl, phenyl, naphthyl, substituted phenyl or substituted naphthyl said substituted phenyl and substituted naphthyl bearing cyano, halo, lower alkanesulfonyl or nitro, with about an equimolar proportion of the N-carboxy anhydride of a second amino acid

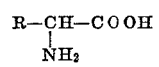

wherein R has the same meaning as above, the additional reactive functional groups in said amino acids being protected by a carbobenzoxy, t-butoxycarbonyl, benzyl ether, dihydropyranyl, t-butyl ester or benzyl ester group, for a period up to about 24 hours at a temperature within the range of about 0 to 60° C., in an organic solvent in which both reactants are soluble, and hydrolyzing the reaction product with aqueous acid.

2. A process as in claim 1 wherein R″ is phenyl.

3. A process as in claim 1 wherein the N-carboxyanhydride is the N-carboxy anhydride from phenylglycine or ester thereof.

4. A process as in claim 1 wherein the first amino acid is phenyl alanine or ester thereof.

5. A process as in claim 1 wherein the N-benzylidene Schiff's base of phenylalanine lower alkyl ester is reacted with N-carboxy-D-phenylglycine anhydride.

References Cited

UNITED STATES PATENTS 3,288,800  11/1966  Heuser et al. _____ 260—306.7
3,704,246  11/1972  Bodanszky _____ 260—112.5

OTHER REFERENCES

Bailey, J. Chem. Soc., *1950*, 3461 (1950).

Zaoral et al.: Coll. Czech. Chem. Comm., 20, 1186 (1955).

Honzl et al., Coll. Czech. Chem. Comm., 20, 1195 (1955).

Schroder et al.: *The Peptides*, v. I, Academic Press, N.Y. (1965), pp. 49–50.

Caronna, Gazz. Chem. Ital., 78, 38 (1948).

Patai, *Chemistry of the Carbon Nitrogen Bond*, Interscience, London (1970), pp. 64–67, 266.

LEWIS GOTTS, Primary Examiner

R. J. SUYAT, Assistant Examiner